United States Patent
Baboescu et al.

(10) Patent No.: US 9,668,113 B2
(45) Date of Patent: May 30, 2017

(54) COMMUNICATIONS SYSTEM HAVING PROXIMITY SERVICE DISCOVERY

(71) Applicant: Avago Technologies General IP (Singapore) Pte. Ltd., Singapore (SG)

(72) Inventors: Florin Baboescu, Santa Clara, CA (US); Dutt Kalapatapu, Santa Clara, CA (US); Kamesh Medapalli, San Jose, CA (US); Marko Niemi, Oulu (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/707,848

(22) Filed: May 8, 2015

(65) Prior Publication Data
US 2015/0327019 A1    Nov. 12, 2015

Related U.S. Application Data

(60) Provisional application No. 61/991,362, filed on May 9, 2014.

(51) Int. Cl.
| | |
|---|---|
| *H04W 24/00* | (2009.01) |
| *H04W 4/12* | (2009.01) |
| *H04W 4/02* | (2009.01) |
| *H04W 4/00* | (2009.01) |
| *H04W 68/00* | (2009.01) |

(52) U.S. Cl.
CPC .............. *H04W 4/12* (2013.01); *H04W 4/005* (2013.01); *H04W 4/023* (2013.01); *H04W 4/025* (2013.01); *H04W 68/00* (2013.01)

(58) Field of Classification Search
CPC ....... H04W 4/12; H04W 68/00; H04W 4/023; H04W 4/0251; H04W 4/005
USPC ........... 455/456.3, 466, 41.2, 435.1; 370/351
See application file for complete search history.

(56) References Cited

U.S. PATENT DOCUMENTS

| | | | | |
|---|---|---|---|---|
| 2008/0113679 | A1* | 5/2008 | Sung ................... | H04L 12/5835 455/466 |
| 2008/0285542 | A1* | 11/2008 | Jachner ................ | H04L 12/581 370/351 |
| 2010/0216489 | A1* | 8/2010 | Green .................... | H04L 67/24 455/456.3 |
| 2014/0004796 | A1* | 1/2014 | Cakulev ............. | H04W 76/023 455/41.2 |
| 2014/0057667 | A1* | 2/2014 | Blankenship ......... | H04L 67/303 455/500 |

(Continued)

OTHER PUBLICATIONS

3GPP TS 23.141 V11.0.0 (Sep. 2012),Technical Specification 3rd Generation Partnership Project; Technical Specification Group Services and System Aspects; Presence Service; Architecture and functional description(Release 11).*

*Primary Examiner* — Charles Shedrick
(74) *Attorney, Agent, or Firm* — Sterne, Kessler, Goldstein & Fox P.L.L.C.

(57) ABSTRACT

Systems and methods disclosed herein provide proximity services using a proximity services server that can be integrated into existing network infrastructure. Proximity services procedures are disclosed, including procedures for registration to a proximity services server, publication of the direct path of a proximity services enabled user equipment (UE) to a proximity services server, requesting proximity information by a UE, and notifying UEs that are in proximity.

20 Claims, 11 Drawing Sheets

(56) References Cited

U.S. PATENT DOCUMENTS

2015/0282108 A1* 10/2015 Kiss ..................... H04W 60/00
455/435.1

* cited by examiner

COMMUNICATIONS SYSTEM HAVING PROXIMITY SERVICE DISCOVERY

CROSS REFERENCE TO RELATED APPLICATIONS

This application claims the benefit of U.S. Provisional Patent Application No. 61/991,362, filed on May 9, 2014, which is incorporated by reference herein in its entirety.

FIELD OF THE DISCLOSURE

This application relates generally to wireless communications, including discovery within a communication environment.

BACKGROUND

As users of communication devices (e.g., cellular phones) increasingly rely on their communication devices to perform tasks and services, many users want to locate other users nearby. The cellular network industry and service providers need solutions to provide location information to users of communication devices to address these user desires.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
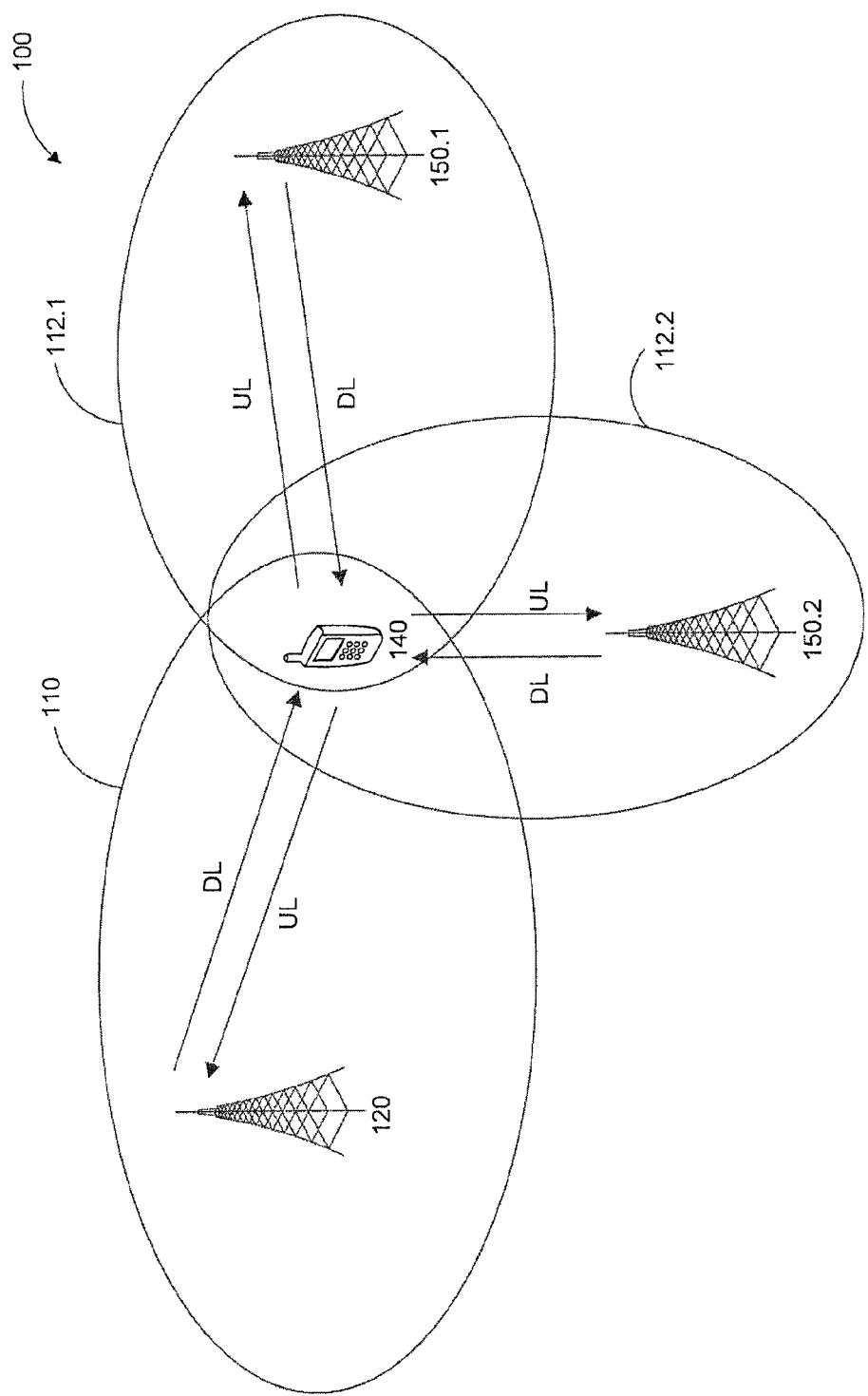
FIG. 1 illustrates an example network environment.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of hardware (such as circuits, microchips, processors, or devices, or any combination thereof), computer instructions, or firmware, or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. COMMUNICATION ENVIRONMENT

FIG. 1 illustrates an example communication environment 100 that includes one or more base stations 120, one or more mobile communication devices 140, and one or more access points (APs) 150. The base station(s) 120, mobile communication device(s) 140, and AP(s) 150 each include one or more processors, circuitry, and/or logic that is configured to communicate via one or more wireless technologies. The one or more processors can include (and be configured to access) one or more internal and/or external memories that store instructions and/or code that, when executed by the processor(s), cause the processor(s) to perform one or more operations to facilitate communications via one or more wireless technologies as discussed herein. Further, one or more of the mobile communication devices 140 can be configured to support co-existing wireless communications. The mobile communication device(s) 140 can include, for example, a transceiver having one or more processors, circuitry, and/or logic that is configured to transmit and/or receive wireless communications via one or more wireless technologies within the communication environment 100.

The base station(s) 120 and AP(s) 150 each include one or more processors, circuitry, and/or logic that is configured to: (1) receive one or more wired communications via one or more well-known wired technologies (e.g., within a core (backhaul) network) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within a core network, and (3) to transmit and/or receive wireless communications via one or more wireless technologies within the communication environment 100. The wireless technologies can include, for example, one or more wireless protocols discussed above. The number of mobile communication devices 140, base stations 120 and/or APs 150 are not limited to the numbers shown in the exemplary embodiment illustrated in FIG. 1, and the communication environment 100 can include any number of mobile communication devices 140, base stations 120 and/or APs 150 as would be understood by those skilled in the relevant arts without departing from the spirit and scope of the present disclosure.

The mobile communication device 140 can be configured to communicate with the base station 120 in a serving cell or sector 110 of the communication environment 100, to communicate with the access point (AP) 150.1 in a wireless local area network (WLAN) 112.1 and/or to communicate with the AP 150.2 in a WLAN 112.2. For example, the mobile communication device 140 receives signals on one or more downlink (DL) channels and transmits signals to the base station 120, AP 150.1 and/or the AP 150.2 on one or more respective uplink (UL) channels. In exemplary embodiments, the mobile communication device 140 can be configured to utilize the Access Network Query Protocol (ANQP) to exchange information with the APs 150. Further, one or more of the APs 150 can be Hotspot 2.0 compliant, as defined in the IEEE 802.11u standard. In these examples, the mobile communication device 140 can be configured to exchange backhaul bandwidth and/or data rate information, connectivity information, capability information, and any other connection and/or communication information associated with the AP(s) 150 as would be understood by those skilled in the relevant arts utilizing the ANQP.

In an exemplary embodiment, one or more of the base stations 120 includes one or more processors, circuitry, and/or logic that is configured for communications conforming to 3GPP's Long-Term Evolution (LTE) specification (e.g., the base station is an LTE base station), one or more of the APs 150 includes one or more processors, circuitry, and/or logic that is configured for communications conforming to IEEE's 802.11 WLAN specification (e.g., the AP 150 is a WLAN access point), and one or more of the mobile communication devices 140 include one or more processors, circuitry, and/or logic that is configured for communications conforming to 3GPP's LTE specification and IEEE's 802.11 WLAN specification. The one or more processors, circuitry, and/or logic of the mobile communication device 140 can be further configured for communications conforming to one or more other 3GPP and/or non-3GPP protocols via one or more device-to-device communication networks established with one or more other mobile communication devices. That is, the mobile communication device(s) 140 are configured to wirelessly communicate with the base station(s) 120 utilizing 3GPP's LTE specification, with the AP(s) 150 utilizing IEEE's 802.11 WLAN specification, and/or with one or more other mobile communication devices 140 directly utilizing 3GPP's LTE specification, IEEE's 802.11 WLAN specification, and/or one or more other 3GPP and/or non-3GPP protocols. In this example, the serving cell or sector 110 is an LTE serving cell or sector and the WLANs 112 are WLANs utilizing the 802.11 WLAN specification. In an exemplary embodiment, the communication of the mobile communication device 140 with one or more other mobile communication devices 140 can be a device-to-device communication that bypasses the base station 120, the AP 150, and/or any other base station and/or AP.

Those skilled in the relevant art(s) will understand that the base station(s) 120, the AP(s) 150, and the mobile communication device(s) 140 are not limited to these exemplary 3GPP and non-3GPP wireless protocols, and the base station(s) 120, the AP(s) 150, and/or the mobile communication device(s) 140 can be configured for wireless communications conforming to one or more other 3GPP and/or non-3GPP wireless protocols in addition to, or in the alternative to, the wireless protocols discussed herein. Examples of the mobile communication device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some embodiments, the mobile communication device 140 may be a stationary device, including, for example, a stationary computing device—such as a personal computer (PC), a desktop computer, a computerized kiosk, and an automotive/aeronautical/maritime in-dash computer terminal.

1.1 Base Station

Figure 2:
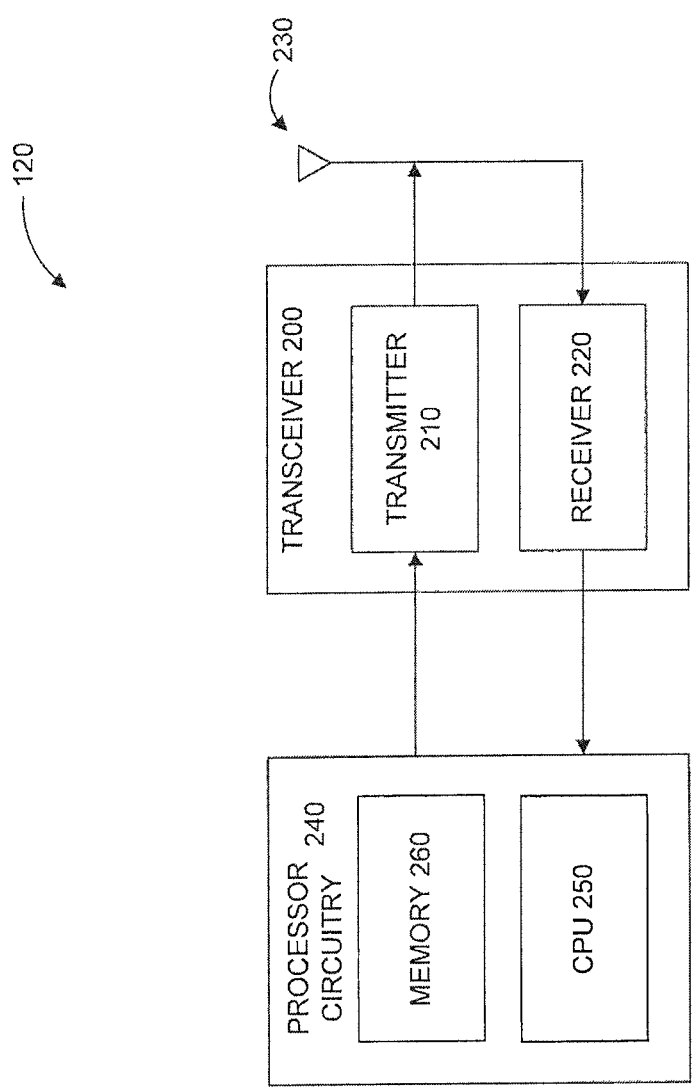
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 communicatively coupled to processor circuitry 240. The transceiver 200 includes one or more processors, circuitry, and/or logic that is configured to transmit and/or receive wireless communications via one or more wireless technologies within the communication environment 100. In particular, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in embodiments where the transceiver 200 is configured for such other communications conforming to the other 3GPP and/or non-3GPP protocols.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 (or access an external memory) that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

1.2 Access Point

Figure 3:
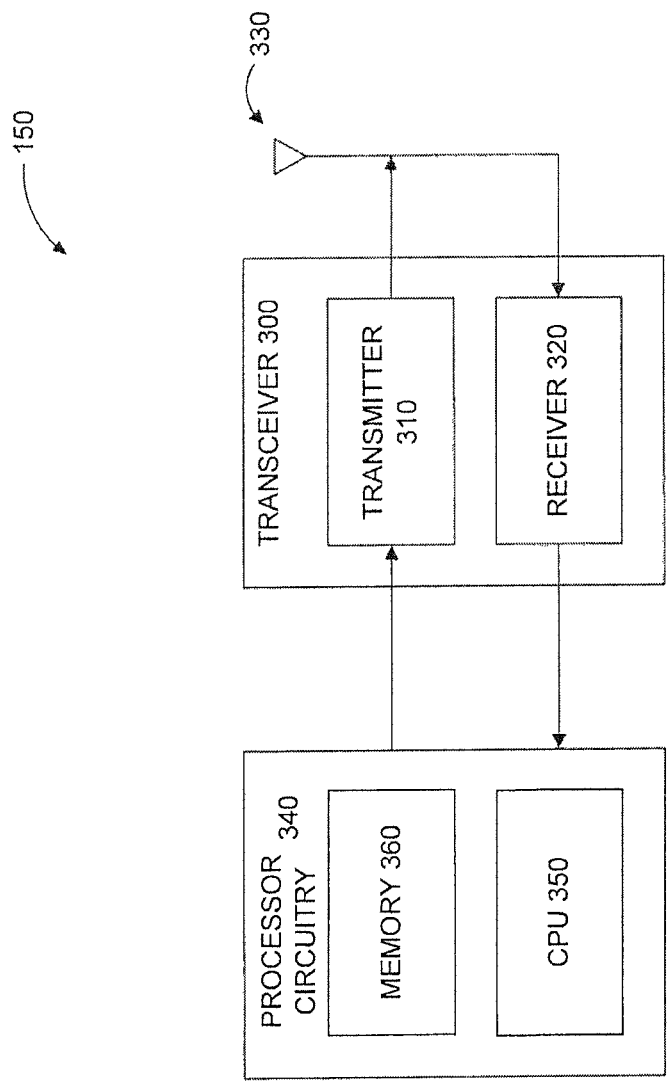
FIG. 3 illustrates an access point according to an exemplary embodiment of the present disclosure.

FIG. 3 illustrates the access point (AP) 150 according to an exemplary embodiment of the present disclosure. For example, the AP 150 can include a transceiver 300 communicatively coupled to processor circuitry 340. The transceiver 300 is similar to the transceiver 200 and includes one or more processors, circuitry, and/or logic that is configured to transmit and/or receive wireless communications via one or more wireless technologies within the communication environment 100. In particular, the transceiver 300 can similarly include a transmitter 310 and a receiver 320 that have one or more processors, circuitry, and/or logic configured to transmit and receive wireless communications, respectively, via one or more antennas 330. Those skilled in the relevant art(s) will recognize that the transceiver 300 can also include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 330 may include an integer array of antennas, and that the antenna 330 may be capable of both transmitting and receiving wireless communication signals. For example, the AP 150 can be configured for wireless communication utilizing a Multiple-input Multiple-output (MIMO) configuration.

In an exemplary embodiment, the transceiver 300 is configured for wireless communications conforming to one or more non-3GPP protocols. For example, the transceiver 300 is configured for wireless communications conforming to IEEE's 802.11 WLAN specification. In this example, the transceiver 300 can be referred to as WLAN transceiver 300. Those skilled in the relevant art(s) will understand that the transceiver 300 is not limited to communication conforming to IEEE's 802.11 WLAN specification, and can be configured for communications that conform to one or more other non-3GPP protocols and/or one or more 3GPP protocols. It should be appreciated that the transceiver 300 can be referred to by one or more other 3GPP and/or non-3GPP protocols in embodiments where the transceiver 300 is configured for such other communications conforming to the other non-3GPP and/or 3GPP protocols.

The processor circuitry 340 is similar to the processor circuitry 240 and includes one or more processors, circuitry, and/or logic that is configured to control the overall operation of the AP 150, including the operation of the transceiver 300. The processor circuitry 340 can include one or more processors (CPUs) 350 and/or circuits configured to carry out instructions to perform arithmetical, logical, and/or input/output (I/O) operations of the AP 150 and/or one or more components of the AP 150. The processor circuitry 340 can further include a memory 360 (or access an external memory) that stores data and/or instructions, where when the instructions are executed by the processor(s) 350, perform the functions described herein. The memory 360 can be any well-known volatile and/or non-volatile memory similar to the memory 260 described above. Similarly, the memory 360 can be non-removable, removable, or a combination of both.

1.3 Mobile Communication Device

Figure 4:
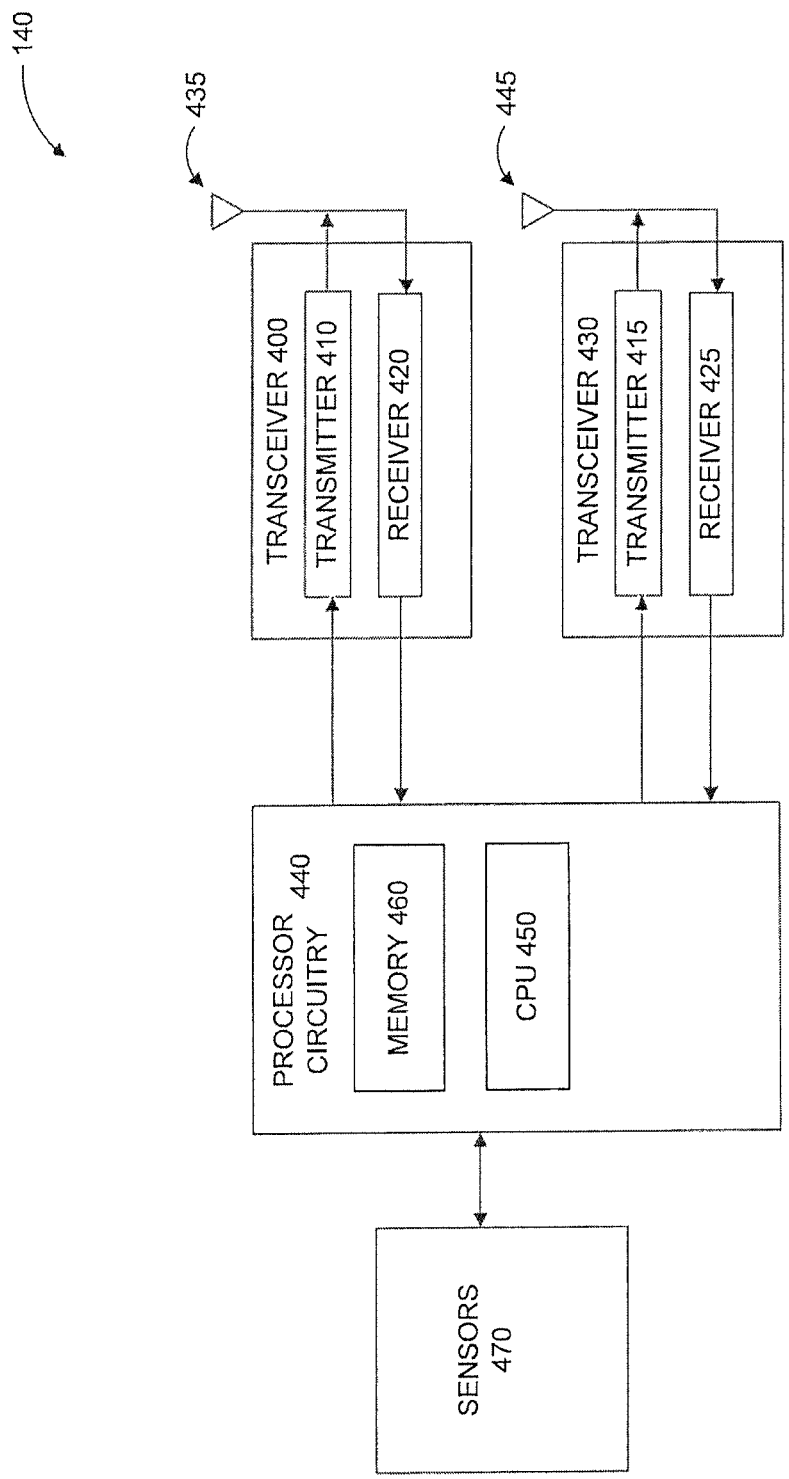
FIG. 4 illustrates a mobile communication device according to an exemplary embodiment of the present disclosure.

FIG. 4 illustrates the mobile communication device 140 according to an exemplary embodiment of the present disclosure. The mobile communication device 140 can include processor circuitry 440 communicatively coupled to an LTE transceiver 400 and a WLAN transceiver 430. The mobile communication device 140 can be configured for wireless communications conforming to one or more wireless protocols defined by 3GPP and/or one or more non-3GPP wireless protocols. In an exemplary embodiment, the mobile communication device 140 is configured for wireless communication conforming to 3GPP's LTE specification and for wireless communication conforming to IEEE's 802.11 WLAN specification. Those skilled in the relevant art(s) will understand that the mobile communication device 140 is not limited to these exemplary 3GPP and non-3GPP wireless protocols, and the mobile communication device 140 can be configured for wireless communications conforming to one or more other 3GPP and/or non-3GPP wireless protocols in addition to, or in the alternative to, the wireless protocols discussed herein, and/or to a subset of the LTE and WLAN specifications discussed above.

The LTE transceiver 400 includes one or more processors, circuitry, and/or logic that is configured for transmitting and/or receiving wireless communications conforming to 3GPP's LTE specification. In particular, the LTE transceiver 400 can include an LTE transmitter 410 and an LTE receiver 420 that have one or more processors, circuitry, and/or logic configured for transmitting and receiving wireless communications conforming to 3GPP's LTE specification, respectively, via one or more antennas 435. Transceiver 400 need not be limited to LTE, and could operate according to one or more other 3GPP and/or non-3GPP protocols, as will be understood by those skilled in art. The WLAN transceiver 430 includes one or more processors, circuitry, and/or logic that is configured for transmitting and/or receiving wireless communications conforming to IEEE's 802.11 WLAN specification. In particular, the WLAN transceiver 430 can include a WLAN transmitter 415 and a WLAN receiver 425 that have one or more processors, circuitry, and/or logic configured for transmitting and receiving wireless communications conforming to IEEE's 802.11 WLAN specification, respectively, via one or more antennas 445. Transceiver 430 need not be limited to WLAN, and could operate according to one or more other 3GPP and/or non-3GPP protocols, as will be understood by those skilled in art.

Regarding the LTE transceiver 400 and the WLAN transceiver 430, the processes for transmitting and/or receiving wireless communications can include (but are not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that antennas 435 and/or 445 may include an integer array of antennas, and that the antennas may be capable of both transmitting and receiving wireless communication signals. It will also be understood by those skilled in the relevant art(s) that any combination of the LTE transceiver 400 and WLAN transceiver 430, as well as one or more other transceivers, circuits, and/or processors may be embodied in a single chip and/or die.

The processor circuitry 440 includes one or more processors, circuitry, and/or logic that is configured to control the overall operation of the mobile communication device 140, including the operation of the LTE transceiver 400 and WLAN transceiver 430. The processor circuitry 440 can include one or more processors (CPUs) 450 and/or circuits configured to carry out instructions to perform arithmetical, logical, and/or input/output (I/O) operations of the mobile communication device 140 and/or one or more components of the mobile communication device 140. The processor circuitry 440 can further include a memory 460 (or access an external memory) that stores data and/or instructions, where when the instructions are executed by the processor(s) 450, perform the functions described herein. Similarly, the memory 460 can be any well-known volatile and/or non-volatile memory, and can be non-removable, removable, or a combination of both.

In an exemplary embodiment, the mobile communication device 140 includes one or more other transceivers (not shown) configured to communicate via one or more 3GPP protocols, one or more non-3GPP protocols, and/or one or more other well-known communication technologies. In an exemplary embodiment, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. Further, the mobile communication device 140 can include one or more positional and/or movement sensors 470 (e.g., GPS, accelerometer, gyroscope sensor, etc.) implemented in (and/or in communication with) the mobile communication device 140. Here, the location and/or movement of the mobile communication device 140 can be determined using one or more transceivers configured for navigation purposes, one or more of the positional and/or movement sensors 470, and/or one or more positional determinations using signal characteristics relative to one or more base stations and/or access points.

2. PROXIMITY SERVICES

Proximity services (ProSe) provide a methodology for determining when user equipment (UE's) are in proximity to each other. In an embodiment, UE's are mobile communication devices, such as mobile communication devices 140. For example, one user of a UE may wish to know the location of nearby users that share the same or similar interests. Embodiments of the present disclosure provide systems and method for providing proximity services to inform nearby users of these interests and to discover nearby users with these interests using a proximity services server that can be integrated into existing network architecture (e.g., using the presence framework described in 3rd Generation Partnership Project (3GPP) Release 23.141, which is incorporated herein by reference in its entirety).

By using existing presence infrastructure defined in 3GPP 23.141, no changes in the radio access network (RAN), evolved packet core (EPC), or IP Multimedia Subsystem (IMS) architecture are needed to provide proximity services solutions.

2.1 Proximity Services Server

Figure 5A:
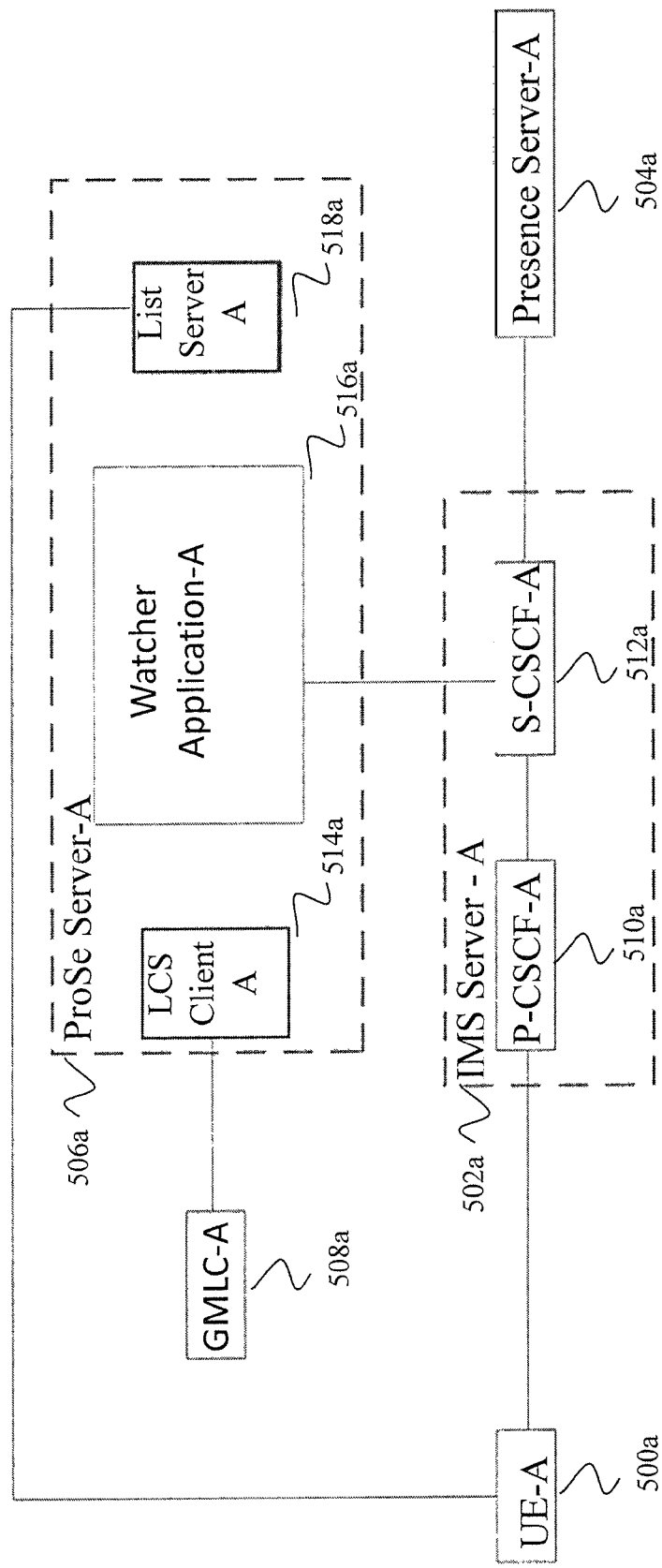
FIG. 5A is a block diagram illustrating a proximity services server according to an exemplary embodiment of the present disclosure.

FIG. 5A is a block diagram illustrating a proximity services server 506a according to an exemplary embodiment of the present disclosure. In FIG. 5A, proximity services (ProSe) server 506a is integrated into network architecture of a Public Land Mobile Network (PLMN), including a Gateway Mobile Location Centre (GMLC) 508a, an IMS server 502a, and a presence server 504a. In an embodiment, UE-A 500A is a mobile communication device, such as mobile communication device 140. UE-A 500a can communicate with ProSe server 506a and IMS server 502a. In an embodiment, ProSe server-A 506a uses IMS registration services provided by IMS Server-A 502a, user profile information provided by presence server 504a, and location services provided by GMLC 508a to provide proximity services for UE-A 500a.

In an embodiment, IMS server-A 502a delivers IP services (e.g., voice data) to UE-A 500a and provides a mechanism for UE-A 500a to register with its credentials to IMS server-A 502a. IMS server-A 502a includes IMS components proxy call session control function (P-CSCF)-A 510a, which is an entry point for UE-A 500a into the IMS domain, and serving call session control function (S-CSCF)-A 512a, which is used to interface with presence server-A 504a and ProSe server-A 506a. For example, in an embodiment, when UE-A 500a registers with IMS-Server-A 502a, P-CSCF-A 510a can provide registration functions for a local geographic area, and S-SCSF-A 512a can provide a registration functions for a regional geographic area (e.g., at the level of a country). When registering with IMS Server-A 502a, UE-A 500a can provide identifying information, such as user credentials, an internet protocol (IP) address, access ports, etc. Using this information, IMS server-A 502a can register UE-A 500a for communications (e.g., for voice calls) over a service provider network.

In an embodiment, presence server-A 504a provides geo-location information and further provides a service that allows a registered IMS user to be informed about the reachability, availability, and willingness of communication with another user. In an embodiment, UE-A 500a can register a user profile with presence server-A 504a to customize the information that can be seen by another user (i.e., a "watcher"). In an embodiment, this user profile can contain information regarding the capabilities of UE-A 500a. In an embodiment, the user profile can take the form of an Extensible Markup Language (XML) file that specifies user attributes, settings information, and other information regarding. For example, this information can include information regarding the reachability of a user (e.g., "willingness to communicate") and status of a user. In an embodiment, by changing, for example, the "willingness to communicate" attribute in the user profile, the user can determine whether he or she is willing to share information with another user, such as a geographic location or shared interest information. Using this information, presence server-A 504a can generate a database of user information and corresponding user locations.

In an embodiment, GMLC-A 508a provides location based services to ProSe server-A 506a by accessing location information from a service provider. For example, GMLC-A 508a can tell ProSe server-A 506a the location of a particular user. In an embodiment, GMLC-A 508a sends this information to location services (LCS) client-A 514a of ProSe server-A 506a. Thus, ProSe server-A 506a obtains knowledge of a user's IP address from IMS Server-A 502a and knowledge of the user's physical location from GMLC-A 508a.

In an embodiment, ProSe server-A 506a is an IMS application server that communicates to UE's (e.g., UE-A 500a) and other network entities. ProSe server-A 506a includes watcher application-A that watches UE's of interest to UE-A 500a and manages one or more watcher lists for each UE in list server-A 518a. UE's can modify their individual watcher list to indicate which information watcher application-A 516a should watch for. List server-A 518a can maintain the one or more lists of information used by ProSe Server-A 516a (e.g., lists of discoverable devices, applications allowed, etc.) For example, UE-A 500a can inform list server-A 518a that the user of UE-A 500a has certain specified interests and would like to be informed of the identity and/or location of other users with these specified interests (e.g., Japanese cooking, skiing, etc.). While registration with regard to user interests is described herein, it should be understood that users can register to be informed of any kind of information regarding other users, such as information regarding professions or group membership. For example, firefighters or police can register to be informed about the location of other firefighters or police in the area.

To summarize, ProSe server-A 506a determines which users to watch using watcher application-A 516a. Watcher application-a 516a obtains information regarding the location of these users using LCS client-A 514a, which obtains this location information from GMLC-A 508a. Watcher application-A 516a further obtains presence information regarding the status of these users (e.g., willing to communicate information in user profiles) by querying presence server-A 504a over IMS infrastructure provided by IMS server-A 502a. Watcher application-A 516a also obtains entity information (e.g., attributes, such as user interests, associated with a user for a particular application) from list server-A 518a.

In an embodiment, ProSe server-A 506a is co-located with IMS server-A 502a and presence server-A 504a. For example, in an embodiment, ProSe server-A 506a, IMS server-A 502a, presence server-A 504a, and/or GMLC-A 508a can be implemented on a backhaul server of a core service provider network. Alternatively, in an embodiment, one or more of ProSe server-A 506a, IMS server-A 502a, presence server-A 504a, and GMLC-A 508a can be located on separate servers. In an embodiment, each of ProSe server-A 506a, IMS server-A 502a, presence server-A 504a, and GMLC-A 508a includes one or more memories and processing circuitry (e.g., including a processor) for performing the functionality described above.

2.3 Roaming and Communication Interfaces

Figure 5B:
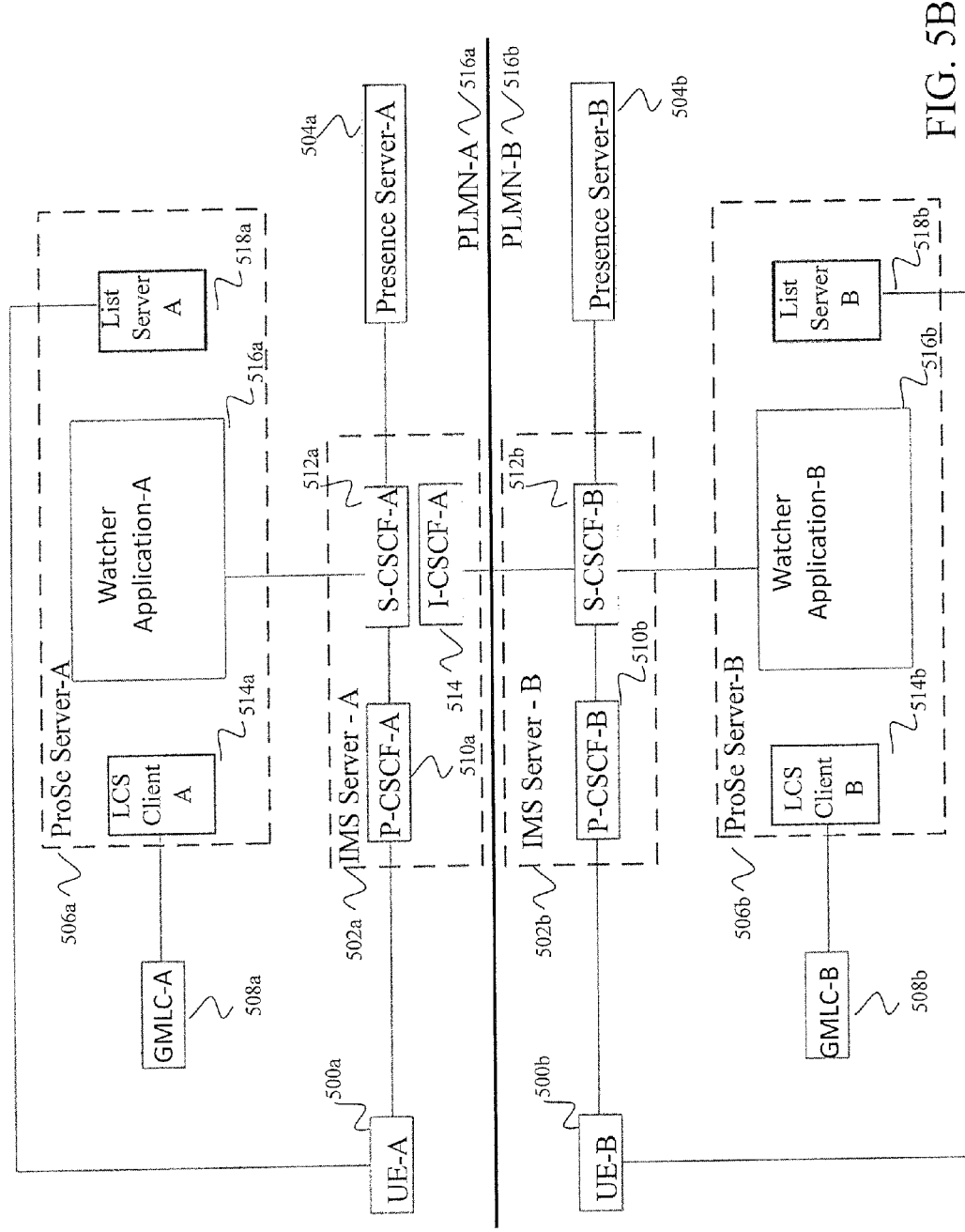
FIG. 5B is a block diagram illustrating roaming according to an exemplary embodiment of the present disclosure.

FIG. 5B is a block diagram illustrating roaming according to an exemplary embodiment of the present disclosure. Embodiments of the present disclosure can use existing IMS infrastructure to provide roaming services. For example, UE-A 500a registered to IMS server-A 502a of PLMN-A 516a can roam to IMS server 502b of PLMN 516b to access information regarding UE-B 500b. In an embodiment, interrogating SCSF-A 514 communicates with S-SCSF-B 512b of IMS server-B 502b according to existing IMS roaming procedures to perform roaming the functionality.

In an embodiment, the components of PLMN-B 516b have substantially similar functionality as the components of PLMN-A 516a. In an embodiment, IMS server-B 502b includes P-SCSF-B 510b and S-SCSF-B 512b and communicates with presence server-B 504b. IMS server-B 502b can also communicate with ProSe server-B 506b, which includes LCS client—B 514b, watcher application—B 516b, and list server-B 518b. LCS client-B 514b communicates with GMLC-B 508b.

In an embodiment, UE-A 500a and UE-B 500b send information to IMS Server-A 502a and IMS Server-A 502b, respectively over Pep interfaces, which carry presentity information as defined by 3GPP 23.141. Presentity information conveys presence information (e.g., whether the user is reachable, whether the user is willing to communicate, etc.) and entity information regarding a specific user profile (e.g., the identity of the user and what information is associated with the user, such as profession or group membership). In an embodiment, IMS Server-A 502a and IMS Server-B 502b communicate with ProSe server-A 506a and ProSe server-B 506b, respectively, using Pw interfaces as defined by 3GPP 23.141. In an embodiment, IMS Server-A 502a also communicates with IMS Server-B 502b using the Pw interface. In an embodiment, UE-A 500a and UE-B 500b communicate (e.g., through a local base station) with list server-A 518a and list server-B 518b, respectively, using PSet interfaces, which are used to manage proximity services lists an are based on the Ut interface defined in 3GPP 23.228.

3. PROXIMITY SERVICES PROCEDURES

Using the architecture shown in FIGS. 5A and 5B, proximity services procedures can be provided for UEs. In an embodiment, these proximity services procedures include procedures for registration to a proximity services server, publication of the direct path of a proximity services enabled UE to a proximity services server, requesting proximity information by a UE, and notifying UEs that are in proximity. Each of these procedures is described below with reference to FIGS. 6-9.

3.1 Registration to a Proximity Services Server

Figure 6:
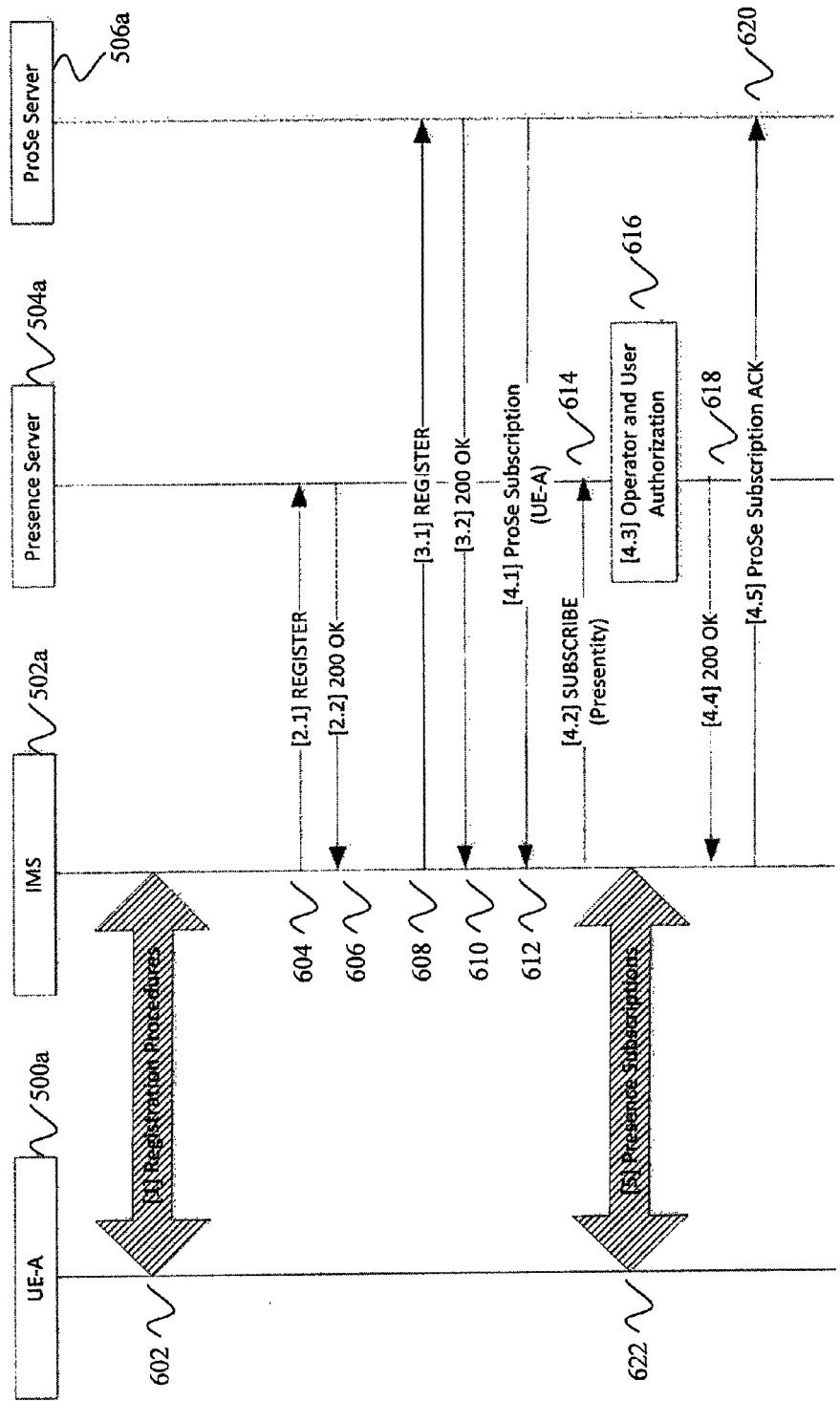
FIG. 6 is a diagram illustrating registration of proximity services enabled user equipment UE to a proximity services server according to an exemplary embodiment of the present disclosure.

FIG. 6 is a diagram illustrating registration of UE-A 500a to ProSe server 506a according to an exemplary embodiment of the present disclosure. For example, a user of UE-A 500a may want to register to ProSe server 506a to be notified of users that share similar interests (e.g., Japanese cooking or skiing) to the user of UE-A 500a. To do so, in step 602, UE-A 500a first registers with an IMS network via IMS server 502a using IMS authentication procedures. In step 604, presence server-A 504a communicates with S-CSCF-A 512a of IMS server 502a over an IP multimedia Subsystem Service Control Interface (ISC) interface. As part of the third party registration as described in 3GPP 23.228, presence server-A 504*a* receives the third party registration of UE-A 500*a*. In step 606, presence server 504*a* acknowledges the third party registration. ProSe server-A 504*a* includes watcher application-A 516*a* for presentity and also has an ISC interface towards S-CSCF-A 512*a*. As part of the ISC reference, ProSe server-A 506*a* gets the third party registration in step 608. ProSe server-A 506*a* acknowledges the registration to S-CSCF-A 512*a* in step 610.

Steps 612-620 describe presence subscriptions 622. As ProSe server is notified on the registration of UE-A 500*a*, ProSe server-A 506*a* now can subscribe to the presentity profile for a user of UE-A 500*a*. ProSe server-A 506*a* sends the user profile subscription request to S-CSCF-A 512*a* in step 612. In step 614, S-CSCF-A 512*a* sends the subscription to presence server-A 504*a*. Presence server-A 504*a*, per operator policy, authorizes to ProSe server-A 506*a* to receive the information in step 616. For example, operator policy can pre-authorize subscriptions for ProSe server-A 506*a*, or the policy could ask UE-A 500*a* for authorization. In step 618, presence server-A 504*a* sends an acknowledgement to S-CSCF-A 512*a*. Finally, S-CSCF-A 512*a* propagates the ProSe acknowledgement to ProSe Server-A 506*a* in step 620.

After UE-A 500*a* is registered to ProSe server 506*a* using the procedure described above, UE-A 500*a* can use ProSe server 506*a* to monitor other UEs (e.g., UE-B 500*b*) using watcher application-A 516*a*. For example, UE-A 500*a* can store interest information (e.g., Japanese cooking or skiing) in list server-A 518*a*, and watcher application-A 516*a* can publish this information through IMS server-A 502*a* to other UEs having the same interests. Likewise, other UEs (e.g., UE-B 500*b*) can use this registration procedure to publish information (e.g., regarding their interests), and watcher application-A 516*a* of UE-A 500*a* can learn about these interests as the information from these UEs is published. Publication of information is described below with reference to FIG. 7.

3.2 Direct Path Publication of a Proximity Services Enabled UE

Figure 7:
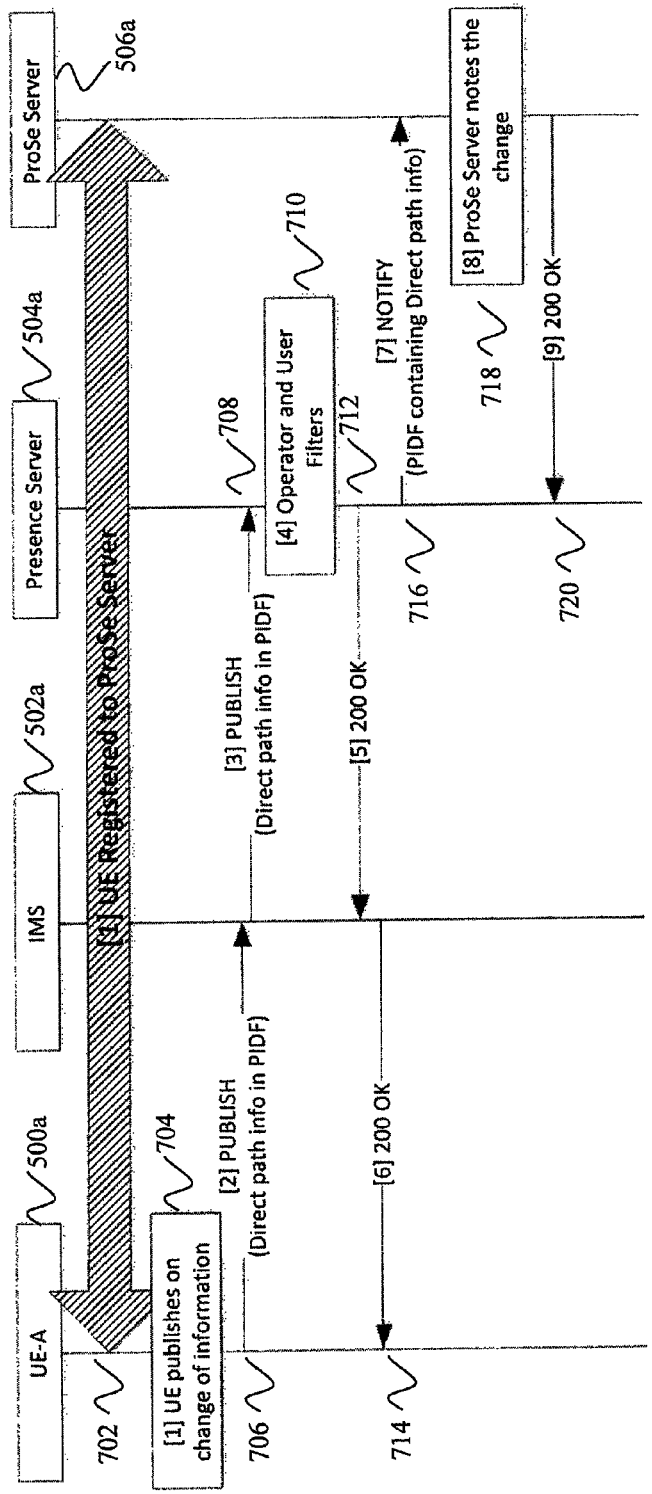
FIG. 7 is a diagram illustrating publication of the direct path of a proximity services enabled UE to a proximity services server according to an exemplary embodiment of the present disclosure.

FIG. 7 is a diagram illustrating publication of direct path information of a proximity services enabled UE (e.g., UE-A 500*a*) to a proximity services server (e.g., ProSe server-A 506*a*) according to an exemplary embodiment of the present disclosure. For example, this direct path information can be a direct path from UE-A 500*a* to ProSe server-A 506*a* over a wireless local area network (WLAN) or a evolved UMTS Terrestrial Radio Access Network (EUTRAN). In an embodiment, ProSe server-A 506*a* can use this information to establish direct communication between UE's (e.g., between UE-A 500*a* and UE-B 500*b*) when they are in proximity. As illustrated by element 702, the direct path publication procedure described in FIG. 7 assumes that UE-A 500*a* is registered to ProSe server-A 506*a* (e.g., using the procedure of FIG. 6).

In step 704, UE-A 500*a* publishes information whenever there is a change in the capability of UE-A 500*a* or upon the user's discretion. For example, the user of UE-A 500*a* may, upon discretion, want to switch off ProSe communication. In step 706, UE-A 500*a* publishes the information through IMS server-A 502*a* (via P-CSCF-A 510*a* and S-CSCF-A 512*a*). The information includes the Presence Information Data Format (PIDF) extension for WLAN/EUTRAN direct communication. In step 708, IMS server 502*a* publishes the information to presence server-A 504*a*. In step 710, presence server-A 504*a* processes the updated information. In step 712, presence server-A 504*a* acknowledge the publish, and IMS server-A 502*a* propagates the acknowledgement in step 714.

If any registered watchers (e.g., watcher application-A 516*a* or watcher application-B 516*b*) need to be notified regarding the updated information, presence server-A 504*a* can notify the watchers. For example, if ProSe server-A 506*a* has an active subscription for updates to the information, presence server-A 504*a* notifies watcher application-A 516*a* of the change in step 716. In step 718, ProSe server-A 718 records the change in the user information along with the direct communication parameters. Finally, in step 720, ProSe server-A 506*a* acknowledges the notification.

3.3 Requesting Proximity Information by a UE

Figure 8:
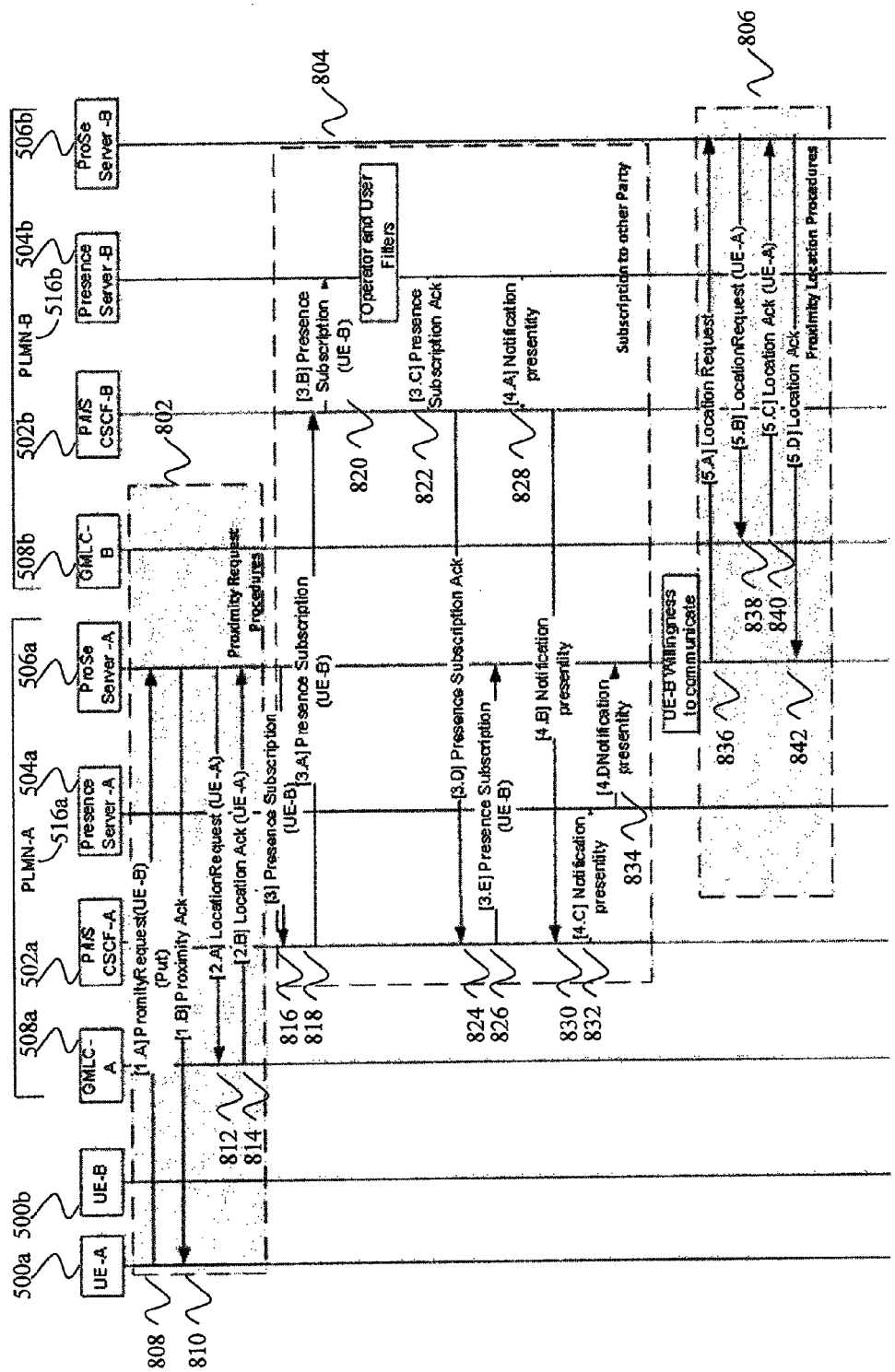
FIG. 8 is a diagram illustrating requesting proximity notifications from another UE according to an exemplary embodiment of the present disclosure.

FIG. 8 is a diagram illustrating requesting proximity notifications from another UE according to an exemplary embodiment of the present disclosure. For example, UE-A 500*a* may want to request a proximity notification from UE-B 500*b* because UE-A 500*a* and UE-B 500*b* share similar interests. FIG. 8 shows proximity request procedures 802, subscription to another party procedures 804, and proximity location procedures 806, which are each explained below.

Proximity request procedures 802 will now be described. For example, UE-A 500*a* may be interested to know when the location of UE-B 500*b* is in proximity to that of UE-A500*a*. UE-B may be in the same PLMN (e.g., PLMN-A 516*a*) or a different PLMN (e.g., PLMN-B 516*b*). UE-A 500*a* sends a proximity request to ProSe server-A 506*a* in step 808. In an embodiment, this interfaces follows the Ut interface. ProSe server-A 506*a* adds UE-B 500*b* to the proximity monitor list for UE-A 500*a* and sends an acknowledgement in step 810. In step 812, ProSe server-A 506*a* requests location information for UE-A 500*a* from GMLC-A 508*a*. In step 814, GMLC-A 508*a* sends the location information to ProSe server-A 506*a*.

Subscription to another party procedures 804 will now be described. For example, UE-A 500*a* can use the IMS subscribe mechanism to request information regarding UE-B 500*b* via IMS server 502*a*. In step 816, ProSe server-A 506*a* sends a presence subscription request to IMS server-A 502*a*. In step 818, IMS server-A 502*a* sends the presence subscription information to IMS server-B 502*b*. In step 820, IMS server-B 502*b* sends the presence subscription information to presence server-B 504*b*. In step 822, presence server-B 504*b* sends an acknowledgement of the presence subscription to IMS server-A 502*a*. In step 824, IMS server-B 502*b* sends an acknowledgement of the presence subscription to IMS server-A 502*a*. In step 826, IMS server-A 502*a* sends an acknowledgement of the presence subscription to ProSe server-A 506*a*.

UE-B 500*b* can have its profile at presence server-B configured to accept or reject presence subscriptions. Based on the UE-B 500*b* profile at presence server-B 504*b*, presence server-B 504*b* accepts the request, rejects the request, or provides only information authorized according to the PLMN-B 516*b* and UE-B 500*b* profiles and/or policies. If the presence subscription is accepted, presence server-B 504*b* sends a notification of presentity information regarding UE-B 500*b* to IMS server-B 502*b* in step 828. For example, in an embodiment, this presentity information can include user profile information for a user corresponding to UE-B 500*b*. In step 830, IMS server-B 502*b* sends a notification of presentity information to IMS server-A 502*a*. In step 832, IMS server-A 502*a* sends a notification of presentity information to presence server-A 504*a*. In step 834, presence server-A 504*a* sends a notification of presentity information to ProSe server-A 506*a*.

Based on UE-B 500*b* willingness to communicate information in UE-B's 500*b* profile in presence server-B 504*b*, ProSe Server-A 506*a* asks for location information regarding UE-B 500*b* through ProSe server-B 506*b* using proximity location procedures 806. In step 836, ProSe server-A 506*a* sends a location request for UE-B's 500*b* location to Pro-Se server-B 506*b*. In step 838, ProSe server-B 506*b* sends a location request for UE-B's 500*b* location to GMLC-B 508*b*. In step 840, GMLC-B 508*b* sends the location information to ProSe server-B 506*b*. In step 842, ProSe server-B 506*b* sends the location information to ProSe server-A 506*a*.

In an embodiment, only the ProSe server that originates the request (e.g., ProSe server-A 506*a*) is responsible for determining proximity. However, this solution does not preclude from both ProSe servers (506*a* and 506*b*) determining proximity and making independent decisions. Further, it should be understood that while FIG. 8 shows a multi-PLMN scenario, the same flow can be used when both UE-A 500*a* and UE-B 500*b* are located in the same PLMN (e.g., PLMN-A 516*a*).

3.4 Notifying UEs in Proximity

Figure 9:
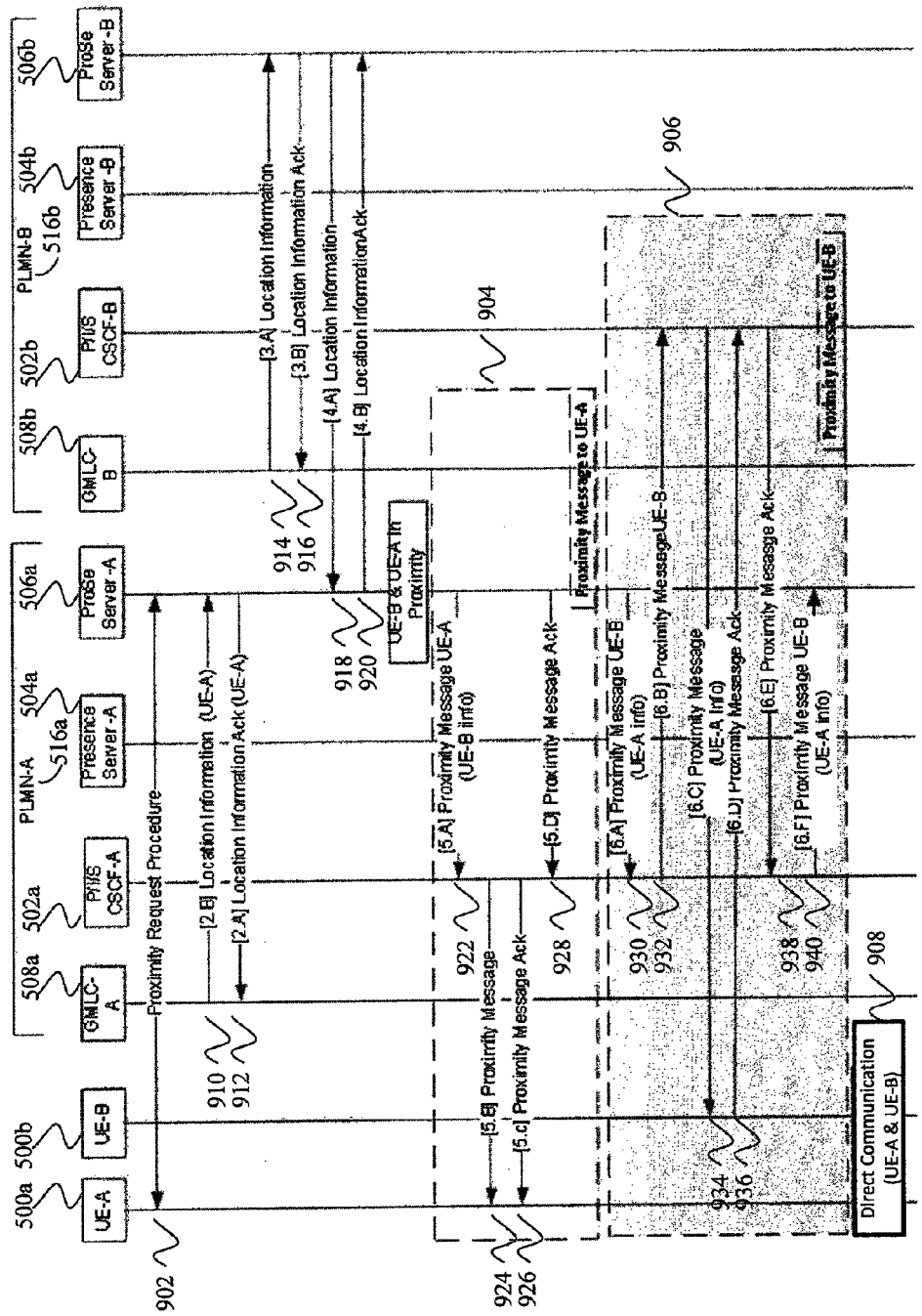
FIG. 9 is a diagram illustrating a proximity services server procedure for notifying a UE that it is in proximity to one or more other UE's according to an exemplary embodiment of the present disclosure.

FIG. 9 is a diagram illustrating a proximity services server procedure for notifying a UE that it is in proximity to one or more other UE's according to an exemplary embodiment of the present disclosure. The notification procedure described in FIG. 9 assumes that UE-A 500*a* already requested proximity information (e.g., using the procedure of FIG. 8), as illustrated by step 902.

First, steps 910-920 are used to determine whether UE-A 500*a* and UE-B 500*b* are in proximity. In step 910, GMLC-A 508*a* sends location information regarding UE-A 500*a* to ProSe server-A 506*a*. In step 912, ProSe server-A 506*a* sends an acknowledgement to GMLC-A 508*a*. In step 914, GMLC-B 508*b* sends location information regarding UE-B 500*b* to ProSe server-B 506*b*. In step 916, ProSe server-B 506*b* sends an acknowledgement to GMLC-B 508*b*. In step 918, ProSe server-B 506*b* sends location information regarding UE-B 500*b* to ProSe server-A 506*a*. In step 920, ProSe server-A 506*a* sends an acknowledgement to ProSe server-B 506*b*. By comparing the location information of UE-A 500*a* and UE-B 500*b*, ProSe server-A 506*a* (e.g., using watcher application 516*a*) can determined whether UE-A 500*a* and UE-B 500*b* are in proximity to each other.

Steps 904 are used to send a proximity message to UE-A 500*a* if ProSe server-A 506*a* (e.g., using watcher application 516*a*) determines that UE-A 500*a* and UE-B 500*b* are in proximity to each other. In an embodiment, Session Initiated Protocol (SIP) messaging is used to communicate with UE-A 500*a*. In an embodiment, the message includes the direct connection (WLAN/EUTRAN) info that UE-A 500*a* can use to communicate directly with UE-B 500*b*. In step 922, ProSe server-A 506*a* sends a proximity message to IMS server-A 502*a*. In step 924, IMS server-A 502*a* sends a proximity message to UE-A 500*a*. In step 926, UE-A 500*a* sends an acknowledgement to IMS server-A 502*a*. In step 928, IMS server-A 502*a* sends an acknowledgement to ProSe server-A 506*a*.

Steps 906 are used to (optionally) send a proximity message to UE-B 500*b* if ProSe server-A 506*a* (e.g., using watcher application 516*a*) determines that UE-A 500*a* and UE-B 500*b* are in proximity to each other. In step 930, ProSe server-A 506*a* sends a proximity message to IMS server-A 502*a*. In step 932, IMS server-A 502*a* sends a proximity message to IMS server-B 502*b*. In step 934, IMS server-B 502*b* sends a proximity message to UE-B 500*b*. In step 936, UE-B 500*b* sends an acknowledgement to IMS server-B 502*b*. In step 938, IMS server-B 502*b* sends an acknowledgement to IMS server-A 502*a*. In step 940, IMS server-A 502*a* sends an acknowledgement to ProSe server-A 506*a*.

Finally, in step 908, UE-A 500*a* and UE-B 500*b* can directly communicate once they are notified that they are in proximity to each other. It should be understood that while FIG. 9 shows a multi-PLMN scenario, the same flow can be used when both UE-A 500*a* and UE-B 500*b* are located in the same PLMN (e.g., PLMN-A 516*a*).

4. EXAMPLE COMPUTER SYSTEM ENVIRONMENT

It will be apparent to persons skilled in the relevant art(s) that various elements and features of the present disclosure, as described herein, can be implemented in hardware using analog and/or digital circuits, in computer instructions, through the execution of instructions by one or more general purpose or special-purpose processors, or as a combination of hardware and instructions.

Figure 10:
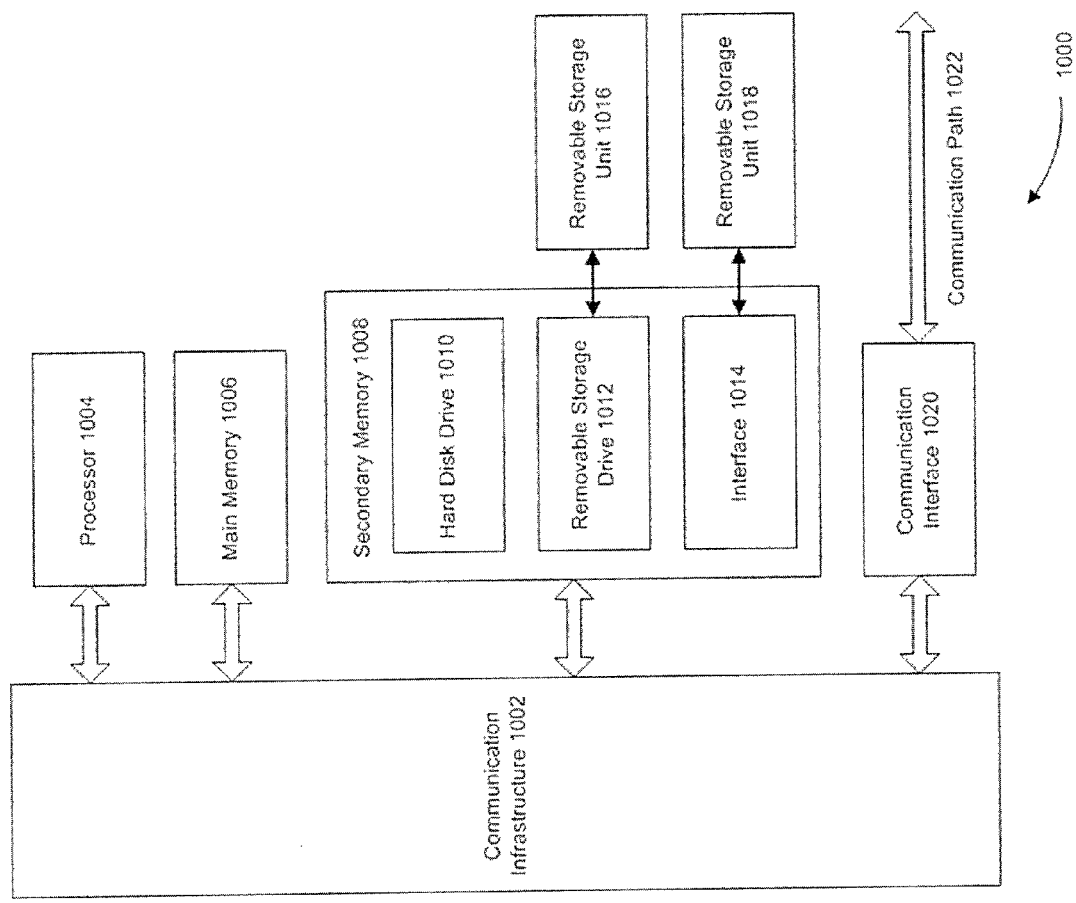
FIG. 10 illustrates a block diagram of an example computer system that can be used to implement aspects of the present disclosure.

The following description of a general purpose computer system is provided for the sake of completeness. Embodiments of the present disclosure can be implemented in hardware, or as a combination of computer instructions and hardware. Consequently, embodiments of the disclosure may be implemented in the environment of a computer system or other processing system. An example of such a computer system 1000 is shown in FIG. 10. Elements (including servers) depicted in FIGS. 2-5B and procedures depicted in FIGS. 6-9 may execute on, or implemented with, one or more computer systems 1000.

Computer system 1000 includes one or more processors (or processor circuitry), such as processor 1004. Processor 1004 can be a special purpose or a general purpose digital signal processor. Processor 1004 is connected to a communication infrastructure 1002 (for example, a bus or network). Various implementations are described in terms of this exemplary computer system. After reading this description, it will become apparent to a person skilled in the relevant art(s) how to implement the disclosure using other computer systems and/or computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer instructions and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow instructions and data to be transferred from removable storage unit 1018 to computer system 1000.

Computer system 1000 may also include a communications interface 1020. Communications interface 1020 allows computer instructions and data to be transferred between computer system 1000 and external devices. Examples of communications interface 1020 may include a modem, a network interface (such as an Ethernet card), a communications port, a PCMCIA slot and card, etc. Instructions and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing instructions to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000. Where the disclosure is implemented using instructions, the instructions may be stored in a computer program product and loaded into computer system 1000 using removable storage drive 1012, interface 1014, or communications interface 1020.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

5. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A proximity services server, comprising:
    a memory; and
    processing circuitry configured to execute instructions stored in the memory for a watcher application, a location services client, and a list server, wherein the watcher application is configured to:
        obtain location information regarding a location of a first mobile communication device from the location services client in response to the first mobile communication device being indicated in a list of information for a second mobile communication device, wherein the first mobile communication device is indicated in the list of information for the second mobile communication device in response to a publication from the first mobile communication device,
obtain user profile information corresponding to the first mobile communication device from a presence server via an IP Multimedia Subsystem (IMS) server,
obtain the list of information for the second mobile communication device from the list server, and
send a message to the second mobile communication device based on the location information and the user profile information.

2. The proximity services server of claim 1, wherein the location services client is configured to obtain the location information from a Gateway Mobile Location Centre (GMLC).

3. The proximity services server of claim 1, wherein the watcher application is configured to obtain the user profile information by communicating with a serving call session control function (S-CSCF) of the IMS server, wherein the S-CSCF is configured to communicate with the presence server.

4. The proximity services server of claim 1, wherein the list server is configured to obtain the list of information from the second mobile communication device.

5. The proximity services server of claim 1, wherein the list of information comprises user interest information for the second mobile communication device.

6. The proximity services server of claim 1, wherein the watcher application is further configured to:
receive registration information from the first mobile communication device; and
send a subscription request for the user profile information to the IMS server, wherein the IMS server is configured to send the subscription request to the presence server, and wherein the presence server is configured to process the subscription request.

7. The proximity services server of claim 6, wherein the registration information includes information regarding a request for notifications regarding a specified user interest.

8. The proximity services server of claim 6, wherein the watcher application is further configured to
receive a notification regarding a change in the user profile information.

9. The proximity services server of claim 1, wherein the watcher application is further configured to:
receive a request for a proximity notification of the second mobile communication device;
send a subscription request to a second presence server corresponding to the second mobile communication device;
send a request for location information corresponding to the second mobile communication device to the second presence server; and
receive from the second presence server, the location information.

10. The proximity services server of claim 1, wherein the watcher application is further configured to:
determine whether the first mobile communication device is in proximity to the second mobile communication device; and
in response to determining that the first mobile communication device is in proximity to the second mobile communication device:
send a first notification message to the first mobile communication device notifying the first mobile communication device that the second mobile communication device is in its proximity; and
send a second notification message to the second mobile communication device notifying the second mobile communication device that the first mobile communication device is in its proximity.

11. A method, comprising:
receiving, at a proximity services server, registration information from a mobile communication device;
sending, from the proximity services server, a subscription request for user profile information to an IP Multimedia Subsystem (IMS) server, wherein the IMS server is configured to send the subscription request to a presence server, and wherein the presence server is configured to process the subscription request;
receiving, at the proximity services server, an acknowledgement of receipt of the subscription request;
storing, at the proximity services server, interest information for the mobile communication device after receiving the acknowledgement of receipt of the subscription request; and
publishing the interest information to other mobile communication devices through the IMS server.

12. The method of claim 11, wherein the registration information includes information regarding a request for notifications regarding a specified user interest.

13. The method of claim 11, further comprising:
receiving, at the proximity services server, a notification regarding a change in the user profile information.

14. The method of claim 13, wherein the presence server sends the notification.

15. The method of claim 13, wherein the notification is sent in response to the subscription request.

16. A method, comprising:
receiving, at a proximity services server and from a first mobile communication device, a request for a proximity notification of a second mobile communication device;
sending, from the proximity services server, a subscription request to an IP Multimedia Subsystem (IMS) server corresponding to the first mobile communication device;
sending, from the IMS server corresponding to the first mobile communication device, the subscription request to an IMS server corresponding to the second mobile communication device;
sending, from the IMS server corresponding to the second mobile communication device, the subscription request to a presence server corresponding to the second mobile communication device;
sending, from the proximity services server, a request for location information corresponding to the second mobile communication device to the presence server; and
receiving, from the presence server, the location information.

17. The method of claim 16, further comprising:
receiving, at the proximity services server, an acknowledgement of the subscription request from the presence server.

18. The method of claim 16, further comprising:
receiving, at the proximity services server, user profile information corresponding to the second mobile communication device from the presence server.

19. The method of claim 16, further comprising:
determining, at the proximity services server, whether the first mobile communication device is in proximity to the second mobile communication device; and
in response to determining that the first mobile communication device is in proximity to the second mobile communication device:
  sending, from the proximity services server, a first notification message to the first mobile communication device notifying the first mobile communication device that the second mobile communication device is in its proximity; and
  sending, from the proximity services server, a second notification message to the second mobile communication device notifying the second mobile communication device that the first mobile communication device is in its proximity.

20. The method of claim 19, wherein determining whether the first mobile communication device is in proximity to the second mobile communication device comprises;
  receiving first location information regarding the first mobile communication device from a first Gateway Mobile Location Centre (GMLC);
  receiving second location information regarding the second mobile communication device from a second GMLC; and
  comparing, at the proximity services server, the first location information and the second location information to determine whether the first mobile communication device is in proximity to the second mobile communication device.

* * * * *

UNITED STATES PATENT AND TRADEMARK OFFICE
CERTIFICATE OF CORRECTION

PATENT NO. : 9,668,113 B2  
APPLICATION NO. : 14/707848  
DATED : May 30, 2017  
INVENTOR(S) : Baboescu et al.

Page 1 of 1

It is certified that error appears in the above-identified patent and that said Letters Patent is hereby corrected as shown below:

In the Claims

In Column 17, Line 43, replace "configured to" with --configured to:--.

In Column 19, Line 20, replace "comprises;" with --comprises:--.

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*